March 6, 1928.
J. H. NEWPORT
1,661,193
WATER HEATER
Filed Dec. 28, 1922
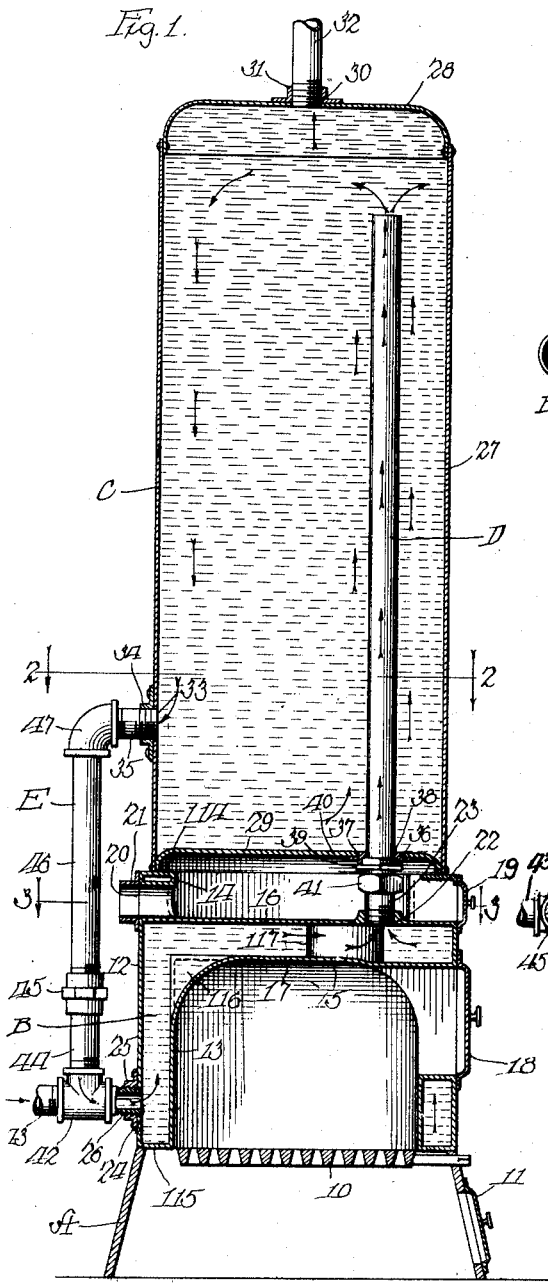
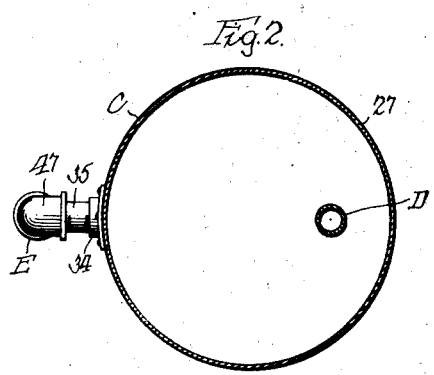
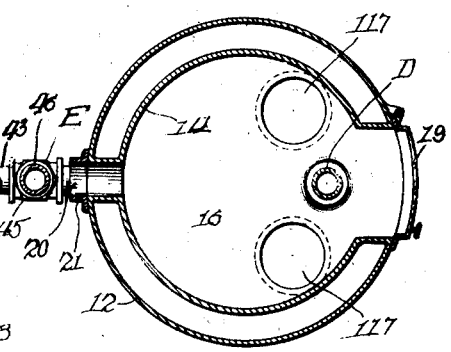
Inventor:
J. H. Newport.
George I. Haight
his Attys.

Patented Mar. 6, 1928.

1,661,193

UNITED STATES PATENT OFFICE.

JESSE H. NEWPORT, OF KENILWORTH, ILLINOIS.

WATER HEATER.

Application filed December 28, 1922. Serial No. 609,380.

This invention relates to improvements in water heaters.

One object of the invention is to provide an efficient hot water heater, of simple construction, comprising a fire pot, forming the heater proper, and a water storage tank connected thereto, together with means for effecting proper circulation of the water in and between the fire pot and the tank.

Another object of the invention is to provide a device of the type specified, wherein the fire pot, forming the heater proper, and the storage tank are separate, detachably connected units, one size of fire pot unit being adapted to have assembled therewith any one of a number of different sizes of water storage tanks, whereby the different sizes of commercial tanks, of this type, may be made use of.

Another object of the invention is to provide a hot water heater of the type specified, wherein the fire pot is water jacketed to form the heater proper, the water storage tank is supported by the fire pot in such a manner that the bottom thereof is exposed to the heat of the fire within the fire pot, and separable pipe connections are provided between the storage tank and the fire pot to detachably connect the same and establish communication therebetween for the proper circulation of the water.

In the drawing forming a part of this specification, Fig. 1 is a central, vertical sectional view taken through a water heater, showing my improvements in connection therewith. Fig. 2 is a horizontal, transverse sectional view taken substantially on the line 2—2 of Fig. 1. And Fig. 3 is a horizontal transverse sectional view taken substantially on the line 3—3 of Fig. 1.

As shown in said drawing my improved water heater comprises broadly, a cylindrical base casting or supporting member A, a water jacketed fire pot B, a cylindrical storage tank C and water conducting pipes D and E.

The supporting member A comprises a hollow frusto-conical casting which supports the grate member 10 and is provided with a door 11 to provide access to the interior thereof for the removal of the ashes.

The fire pot B is directly supported by the base casting A. Said fire pot B is provided with a water compartment defined by an outer cylindrical wall 12, a lower inner cylindrical wall 13, an upper narrow cylindrical wall 14 and top and bottom annular walls 114 and 115. Near the top, the fire pot B is provided with a hollow horizontally extending water partition 15 having top and bottom horizontally extending walls 16 and 17, said partition being in communication with the other portions of the water chambered fire pot. Preferably, a plurality of arches 116 are employed on the underside of the wall 16 to thereby provide a greater amount of direct heating surface. By referring to Fig. 3, it will be noted that two circular flues 117 are provided within the hollow partition, said flues 117 being located to one side and relatively closely adjacent the pipe D, for the purpose hereinafter specified.

At the front side of the fire pot are provided doors 18 and 19. The door 18 closes an opening through the front wall of the fire pot which leads to the combustion chamber. The door 19 closes an opening leading to the flue chamber for a purpose hereinafter described. Diametrically opposite to the door 19, the fire pot casting is provided with an opening 20, communicating with the flue box. A fitting 21 is, suitably secured to the outer wall 12 of the fire pot B in alinement with the opening 20 and serves as a connecting means for an ordinary stove pipe, through which the gases of combustion are carried off. The upper wall 16 of the partition 15 is provided with a screw threaded opening 22 adapted to have screwed thereinto a nipple 23. The outer wall 12 of the fire pot B is provided near its lower end with a water inlet opening 24. An interiorly screw-threaded pipe flange member 25, is secured to the wall 12 in alinement with the opening 24 and has screwed therein a nipple 26.

To promote economy in first cost and also to minimize the expense of setting up the heater, I preferably employ tanks C of well known commercial form such as now used for heating water for household purposes.

The tank C as shown in the drawings, comprises a cylindrical shell 27 closed at its opposite ends by a substantially convex top wall 28 and an inset, dished bottom wall 29. The upper wall 28 of the tank C is provided with the usual hot water outlet opening 30, having associated therewith the internally screw threaded pipe flange member 31, adapted to have screwed therein the outlet pipe 32. Near the lower end of the storage tank C, the shell 27 is provided with an opening 33, having associated therewith an internally screw threaded pipe flange member 34, receiving the nipple 35. The bottom wall 29, of the storage tank C is provided with an opening 36. A flanged collar 37 extends within the opening 36 and is suitably secured to the bottom 29 of the tank. The opening 38 of the flanged collar 37 is of such a size as to freely receive the pipe D. As clearly shown in Figures 1 and 3, a pipe D is located to one side of the heater and at a point midway between the flues 117, for the purpose hereinafter described.

The pipe D passes through the opening 38 and is held in fixed position therein by the nut 39 threaded within the opening 38 of the collar 36. Suitable packing is inserted between the internal flange 40 of the collar 36 and the nut 39 to properly seal the opening and prevent leakage of water between the pipe and the collar. The pipe D extends upwardly internally of the tank to within a short distance of the top thereof. The nipple 22, connected to the upper wall of the partition 17 of the fire pot is detachably connected to the lower end of the pipe D by a union 41.

The pipe E comprises a T 42 connected at one end to the nipple 26 and connected at the other end to a cold water supply pipe 43, a relatively short length of pipe 44, connected to the side opening of the T, a union 45, a relatively long pipe 46, and an L 47 connected to the nipple 35.

In the operation of my improved water heater, the water contained within the water jacket of the fire pot being exposed to the direct heat of the fuel in the combustion chamber, is raised to a higher temperature than the water contained in the storage tank C and rises upwardly through the pipe D and is directed by the latter to the upper end of said tank. Circulation between the tank C and the water jacket of the fire pot B is provided by the connecting pipe E, the cooler water settling to the bottom of the tank C, and passing through the pipe E to the bottom of the water jacket of the fire pot B. The path of circulation of the water is clearly indicated by the arrows in Fig. 1. The cold water is fed to the water heater through the supply pipe 43 passing into the lower end of the water jacket of the fire pot B, and the heater water is drawn off through the usual outlet pipe 32.

As will be evident from the preceding description considered in connection with the drawing, the products of combustion will travel first along the under side of the horizontal partition of the fire pot toward the flue openings 117, thence upwardly through the latter immediately around the lower end of the pipe D, and thence will travel horizontally in the reverse direction or toward the left as viewed in Fig. 1, thus providing direct contact with the bottom wall 29 of the tank and making the latter a direct heating surface. The products of combustion finally pass out through the flue pipe 21 to the chimney. By this arrangement, I obtain, for a heater of given size, maximum direct heating surface including the bottom wall of the tank; also products of combustion when at their highest temperature are concentrated about and against the lower end of the pipe D so as to raise the temperature of the water at the bottom of the pipe D very rapidly and effect extremely rapid circulation of the water upwardly through the pipe D and thence around within the tank C.

Due to the concentration of the heat, as aforesaid, at the lower end of the pipe D and the consequent rise of the temperature of the water within the pipe D, circulation of the water within the tank C is induced upwardly around the pipe D as indicated by the arrows, which still further increase the rapidity of the circulation and thus increases the efficiency of the heater.

Furthermore, by locating the pipe D as above described, directly in front of and closely adjacent the door 19, manipulation of the union 41 for assembling and disassembling the parts, is greatly facilitated since ample room is provided for applying the wrench to the union and for oscillating the handle within the door opening.

By making the upper wall 114 of the fire pot of appreciable width, as heretofore described and as shown in the drawing, I am enabled to utilize a fire pot of one size with commercial storage tanks of different diameters as well as tanks of different heights and capacities, thus further decreasing the cost of manufacture.

I claim:

1. In a heater of the character described, the combination with a water chambered fire pot having a horizontal partition near the top thereof and said partition being provided with a flue passage way therethrough; of a separate water storage tank supported on said fire pot and having a bottom wall spaced above the said horizontal partition to thereby provide with the latter a supplemental flue chamber and a direct heating surface on the bottom wall of the tank; a pipe connection between the tank and the fire pot located exteriorly thereof; a second pipe connection between said tank and the fire pot and located within the confines of the side walls of the tank and the fire pot, the said second connection comprising a detachable union; and means providing access from the exterior of the heater to said union for manipulating the latter.

2. In a heater of the character described, the combination with a separate fire pot unit comprising spaced walls defining a central fire pot chamber and a water jacket disposed about the sides and top of said chamber, the outside wall of said fire pot unit being extended vertically upward beyond the top of the water jacket and provided with a horizontally disposed flange, said upwardly extended outside wall, together with the upper wall defining the top of the water jacket partially defining a combustion chamber communicating through the water jacket with the fire pot chamber, said combustion chamber being provided with a flue for the escape of the products of combustion; a separate storage tank of commercial character including a body portion, closed top and bottom, said tank having its peripheral bottom edge supported upon the flange of said fire pot, the bottom wall of said tank forming the top of and completing said combustion chamber, whereby the bottom wall of the tank is subjected directly to the products of combustion passing from the fire pot to said combustion chamber; and detachable means for connecting said tank and said fire pot unit, said means being in the form of pipes having connection with both the fire pot unit and said tank, and communicating with the water jacket and interior of the tank, said pipes being located and constructed for inducing circulation from said water jacket into said tank, and from said tank into said water jacket.

3. In a heater of the character described, the combination with a separate fire pot unit comprising spaced walls defining a central fire pot chamber and a water jacket disposed about the sides and top of said chamber, the outside walls of said fire pot unit being extended vertically upward beyond the top of the water jacket and provided with a horizontally disposed annular flange, said upwardly extended outside wall, together with the upper wall defining the top of the water jacket partially defining a combustion chamber communicating through the water jacket with the fire pot chamber, said combustion chamber being provided with a flue for the escape of the products of combustion; a separate storage tank of commercial character including a body portion, closed top and bottom, said tank having its peripheral bottom edge supported upon the annular flange of said fire pot, the bottom wall of said tank forming the top of and completing said combustion chamber, whereby the bottom wall of the tank is subjected directly to the products of combustion passing from the fire pot to said combustion chamber; and means for detachably connecting said tank to the fire pot unit, said means comprising a pipe extending through the bottom of said tank to a point near the top thereof and at one side of said tank, said pipe extending through said combustion chamber and having a detachable connection with the wall defining the top of the water jacket, and a pipe exterior of said tank and water jacket for detachably connecting the lower portion of said tank with the lower portion of said water jacket.

In witness that I claim the foregoing I have hereunto subscribed my name this 11th day of Dec. 1922.

JESSE H. NEWPORT.